No. 877,614. PATENTED JAN. 28, 1908.
T. J. THOMPSON.
COMBINED SHOVEL AND BRUSH.
APPLICATION FILED APR. 3, 1907.

WITNESSES:
D. E. Carlsen
L. C. Carlsen

INVENTOR:
Tilford J. Thompson
BY HIS ATTORNEY:
A. M. Carlsen

UNITED STATES PATENT OFFICE.

TILFORD J. THOMPSON, OF VANG, NORTH DAKOTA.

COMBINED SHOVEL AND BRUSH.

No. 877,814.

Specification of Letters Patent.

Patented Jan. 28, 1908.

Application filed April 3, 1907. Serial No. 366,131.

*To all whom it may concern:*

Be it known that I, TILFORD J. THOMPSON, a citizen of the United States, residing at Vang, in the county of Cavalier and State of North Dakota, have invented a new and useful Combined Shovel and Brush, of which the following is a specification.

My invention relates to implements for cleaning barn floors, yards and sidewalks or other surfaces of similar character; and the object is to provide a handy and effective combination implement for said purposes. This and other objects I attain by the novel construction and arrangement of parts illustrated in the accompanying drawing, in which—

Figure 1:
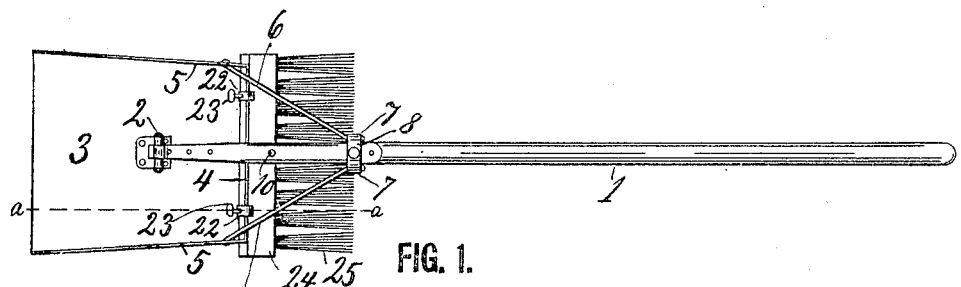
Figure 2:
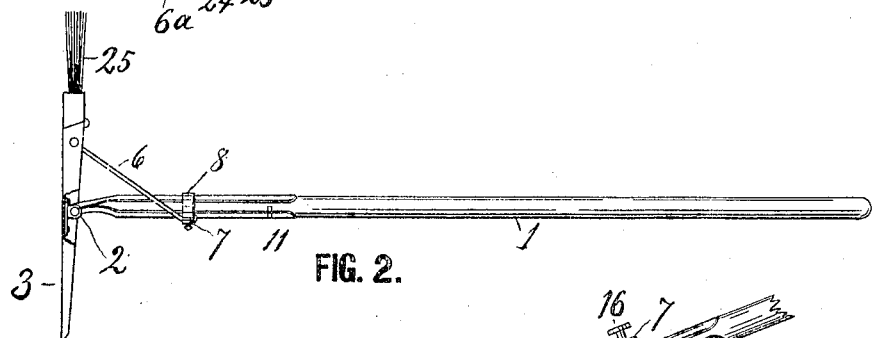
Figure 3:
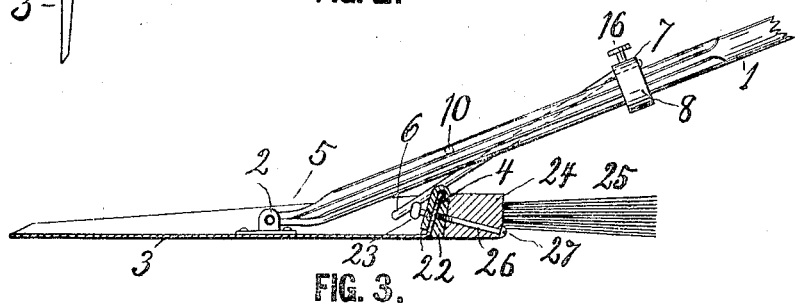
Figure 4:
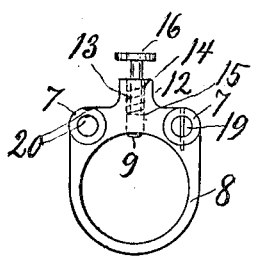
Figure 5:
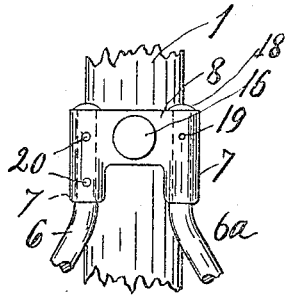
Figure 6:

Figure 1 is a top or plan view of my improved implement in the position it is used as a shovel. Fig. 2 is a side view of the implement as it appears when used alternately as a brush and scraper or even as a hoe. Fig. 3 is a sectional view on the line *a—a* in Fig. 1 with the brace 6ª omitted. Fig. 4 is an enlarged front elevation of a ring sliding on the handle and fixed to the braces 6 and 6ª by which the shovel is held at various angles with relation to the handle. Fig. 5 is an enlarged portion of Fig. 1. Fig. 6 is an enlargement of the rear end of one of the braces 6 and 6ª.

Referring to the drawing by reference numerals, 1 designates the handle of the implement, and to the front end thereof is pivotally joined at 2 the middle portion of a metallic shovel blade 3, whose rear edge and side edges are turned upwardly to form guards 4 and 5, by which the capacity of the shovel is increased.

In the side guards 5 are pivotally secured the front ends of two braces 6 and 6ª, whose rear ends are rigidly secured in the tubular corners 7 of a ring 8 slidingly encircling the handle, and is held in two different positions by having a spring-pressed catch engaged alternately in the two pockets 10 and 11, whereby the shovel is held respectively in the two positions shown in Fig. 2 and Fig. 3. The ring 8 is preferably cast of malleable iron and has a socket 12 in which an expanding coil spring 13 acts between a shoulder 14 of the socket and a shoulder 15 of the catch 9 to hold the latter normally toward the handle. The catch is provided with a head 16 of greater diameter than the top of the socket, so as to afford an easy chance to take hold of the head and disengage the catch from the socket when the position of the blade is to be changed. The braces 6—6ª may be secured in the casting either by giving them shoulders 17 to stop against the front side of the casting and then rivet over the end as 18, at the rear side, or they may be secured by transverse pins like 19, or by pressing or striking with a punch dents 20 in the side of the tubular parts 7 which sink into the sides of the inserted shanks 21 of the braces and hold them.

Upon the rear guard 4 of the blade is secured by two clamps 22, having each a thumb-screw 23, the body or block 24 of a brush 24—25, whose block is secured to the clamp by screws 26 passing forwardly through the block and being tapped into a hole in the clamp in line with the hole having a thumb screw, while the heads of the screws bear against the rear side of the block. Such alinement of the bolt and the thumb screw in each clamp is so far important as the slit or gap of the clamp passing over the guard 4 is so narrow that the two holes must be tapped in one operation by passing the tap through both of them, as it would be very difficult and slow to tap each hole only to the slit, and it would weaken so light a clamp to drill idle clearing holes in it for the tap.

In using the implement, when the blade is in the position shown in Fig. 1 it may be used as a shovel for snow, potatoes, manure, earth &c.; and when the blade is set as in Fig. 2 the implement may be used with the blade as a scraper in cleaning light snow, manure and the like from a fairly even surface, and to do this more thoroughly and completely the brush 25 is turned downward and applied afterward, or if water or very light snow or other matter is to be brushed or swept away only the brush is used.

Having thus described my invention, what I claim is:—

1. An implement substantially as described, comprising a shovel blade with upturned rear and side edges, a handle pivoted with its front end near the middle of the upper side of the blade and having two cavities in it, a slidable collar on the handle, a spring-pressed finger-catch carried by the collar and adapted to engage alternately in the two cavities and a pair of braces pivotally secured near the rear corners of the blade and having their rear ends fixed to the slidable collar.

2. An implement substantially as described, comprising a shovel blade with upturned rear and side edges, a handle pivoted with its front end near the middle of the upper side of the blade and having two cavities in it, a slidable collar on the handle, a spring-pressed finger-catch carried by the collar and adapted to engage alternately in the two cavities, and a pair of braces pivotally secured near the rear corners of the blade and having their rear ends fixed to the slidable collar, and a brush detachably secured to the rear end of the blade.

In testimony whereof I affix my signature, in presence of two witnesses.

TILFORD J. THOMPSON.

Witnesses:
O. M. HEGSTAD,
ERICK L. THOMPSON.